(12) United States Patent
Mohler

(10) Patent No.: US 6,183,569 B1
(45) Date of Patent: Feb. 6, 2001

(54) CUTTING TORCH AND ASSOCIATED METHODS

(75) Inventor: Jonathan Mohler, Vero Beach, FL (US)

(73) Assignee: Spectre Enterprises, Inc., West Palm Beach, FL (US)

( * ) Notice: Under 35 U.S.C. 154(b), the term of this patent shall be extended for 0 days.

(21) Appl. No.: 09/268,379

(22) Filed: Mar. 15, 1999

(51) Int. Cl.$^7$ ........................................... B23K 7/00
(52) U.S. Cl. ............................................... 148/194; 266/48
(58) Field of Search ...................... 266/48; 102/307; 148/194

(56) References Cited

U.S. PATENT DOCUMENTS

| | | |
|---|---|---|
| 2,399,211 | 4/1946 | Davis et al. . |
| 2,587,243 | 2/1952 | Sweetman . |
| 3,713,636 * | 1/1973 | Helms et al. ............... 266/48 |
| 4,327,642 | 5/1982 | Gross-Benne et al. . |
| 4,559,890 * | 12/1985 | Regalbuto et al. ........... 266/48 |
| 4,693,181 | 9/1987 | Dadley et al. . |
| 4,815,384 | 3/1989 | Ringel et al. . |
| 4,963,203 | 10/1990 | Halcomb et al. . |
| 4,996,922 | 3/1991 | Halcomb et al. . |
| 5,377,594 | 1/1995 | Alford . |

* cited by examiner

*Primary Examiner*—Scott Kastler
(74) *Attorney, Agent, or Firm*—Arnold B. Silverman; William F. Lang, IV; Eckert Seamans Cherin & Mellott, LLC

(57) ABSTRACT

An apparatus is disclosed for cutting target material which includes a housing having an inner cavity and an elongated nozzle extending from the inner cavity to communicate with the exterior of the housing. The apparatus is provided with a charge for generating a cutting flame and an activating device coupled to the charge. A method for cutting target material is also provided in which the cutting apparatus has an elongated nozzle positioned generally adjacent to a surface of a target material to be cut. The cutting apparatus may be joined with one or more housings to provide a ganged together or joined cutting apparatus. The effect of this ganged cutting apparatus is to provide an extended linear cutting action on the surface of the target material. In addition, in an opposed cutting apparatus, two housings are positioned with their nozzle channels in opposition to permit cutting target material from two directions.

29 Claims, 7 Drawing Sheets

CUTTING TORCH AND ASSOCIATED METHODS

BACKGROUND OF THE INVENTION

1. Field of the Invention

The present invention generally relates to an apparatus and method for cutting target material. The present invention more particularly relates to an apparatus and method for cutting target material of a substantial thickness using a thermite based charge.

2. Description of the Prior Art

A number of devices for cutting materials of a substantial thickness are known in the art. Many of these devices employ explosive shaped charges which deliver energy to the surface of a material in the form of a high pressure, high velocity shock front. The conical or "V" shaped charge, for example, explodes and focuses cutting energy onto the surface of the material to be cut. A primary disadvantage of explosive shaped charges is that they generate excessive noise and debris upon detonation. This noise and debris can pose potentially serious health and safety hazards to someone using a cutting device which employs conventional shaped charge explosives.

Thermite-based cutting devices which employ a cutting flame produce virtually no extended shock wave and generate relatively little over pressure. Thermite-based cutting devices do not present the same health and safety hazards which are attendant upon explosive shape charge cutting devices.

U.S. Pat. No. 2,587,243 discloses an apparatus for producing a gaseous penetrating jet for cutting materials or objects. This patent uses a chemical charge which, when detonated, ruptures a means interposed along the path of the generated high velocity gases. The means converges upon rupture and causes a material placed beneath the apparatus to be cut by the resultant high velocity gas explosion.

U.S. Pat. No. 4,693,181 discloses a linear cutting charge device including an explosive mass formed in the shape of a bar. Detonation of the charge in this patent is disclosed as stating that it compresses a metal liner and converts the metal liner into an outwardly projected slug of metal, the shape of which is dependent upon the shape of a cavity of the device. It is this outwardly projected slug which penetrates the work surface of a material which is cut or deformed by the detonation and subsequent penetration.

U.S. Pat. No. 4,815,384 discloses a device with a housing for use with joinable or interconnectable cutting charges. The stated purpose of this patent is to avoid formation of a saw-tooth cutting profile on a target work surface acted upon by the device discussed in the patent.

What has not been disclosed in the prior art, however, is use of a thermitebased apparatus for directing or focusing a cutting flame derived from the activation of a thermite charge for the purpose of cutting substantially thick material such as steel plates and bars, for example. In addition, the prior art has not provided a practical solution for effecting an extended, linear cut in a piece of material. The prior art also has not sufficiently addressed concerns related to the health and safety of a user using an explosive shape charge apparatus to create high velocity explosions to cut material. As a result, the prior art has also not adequately considered use of a thermite-based cutting apparatus to alleviate hazards associated with debris, noise and pressure waves generated from using explosive charges to cut material having a substantial thickness.

In spite of the foregoing known apparatus and methods for cutting material, there remains a real and substantial need for an apparatus for cutting material which employs a thermite-based charge to ensure a safe and efficient cutting action.

SUMMARY OF THE INVENTION

The apparatus for cutting material of the present invention includes at least one housing having an inner cavity and an elongated nozzle extending from the inner cavity to the exterior of the housing. An energetic material, such as a thermite charge, is contained within the inner cavity to provide the apparatus with a source for a cutting flame, or high temperature, high velocity jet. An activating device, such as an igniter, is coupled to the thermite charge to develop a cutting flame from the inner cavity when desired by a user. In addition, more than one such cutting apparatus may be joined or "ganged" together to form a unitary cutting apparatus which is capable of performing an extended, linear cutting action on a target material.

In another aspect of the present invention, opposed cutting apparatus are provided for cutting differently shaped material, such as steel bars and bar stock, of various diameters. In this embodiment, the opposing cutting apparatus provide opposing cutting flames which act against at least two sides or portions of a target material. In addition, improved efficiency is achieved by providing better control of burn rate to match the absorption and ablation properties of the target material. Total cutting time is also decreased. Energy losses which normally occur due to thermal conduction of energy from the cutting zone of the target material to other portions of the target material are reduced.

The present invention also discloses a method for cutting a target material comprising the steps of providing at least one housing with an inner cavity and an elongated nozzle in communication with the inner cavity extending to the exterior of the housing. The nozzle is structured to be generally adjacent to a target surface of the target material to be cut. A distance or "standoff" is provided between the end of the nozzle which directs the cutting flame onto the surface of the target material. The method also employs an energy source for generating a high temperature, high velocity cutting flame or jet, such as by employing a thermite charge. The nozzle is then placed an appropriate distance or "standoff" from the target material. The thermite charge is then activated and a cutting flame is generated from the charge positioned in the inner cavity. In another aspect of the method of the present invention, more than one cutting apparatus may be joined or "ganged together" to effect an extended, linear cutting action.

The cutting apparatus of the present invention also provides a safer and more efficient apparatus and method for producing a cut in a portion of a target material having substantially uniform thickness. The cutting apparatus provides an elongated nozzle to accommodate varying thicknesses in the cutting region of different target materials. In the "ganged together" arrangement, the present invention offers a method for effecting substantially longer cuts by joining together more than one apparatus to provide a substantially sequential cutting action. The present invention also provides a formable, and separately storable, thermite powder charge for providing an energy source for generating a cutting flame which produces the cutting action of the apparatus.

It is an object of the present invention to provide a material cutting apparatus having an elongated nozzle structured to be a controlled distance or "standoff" from the surface of a target material.

It is an object of the present invention to provide a safe and economical apparatus for cutting thick materials such as metals, plastics, and ceramics.

It is an object of the present invention to provide a thermite-based cutting apparatus employing a formable thermite powder charge as a source for generating a cutting flame.

It is an object of the present invention to provide an apparatus for cutting various material thicknesses by establishing a nozzle standoff, nozzle cross-section, thermite burn rate, and burn duration.

It is an additional object of the present invention to provide an apparatus capable of effecting an extended, linear cutting action along the surface of the target material to be cut.

It is an object of this invention to maximize cutting efficiency by providing impingement of at least two cutting flames on opposing sides of a target material.

It is a further object of the present invention to provide a cutting apparatus which is capable of cutting shaped material, such as steel bars.

It is a further object of the present invention to provide methods for effecting thermite-based cutting of a thick material.

These and other objects of the present invention will be more fully understood from the following description of the invention on reference to the illustrations appended hereto.

DETAILED DESCRIPTION OF THE INVENTION

Figure 1:
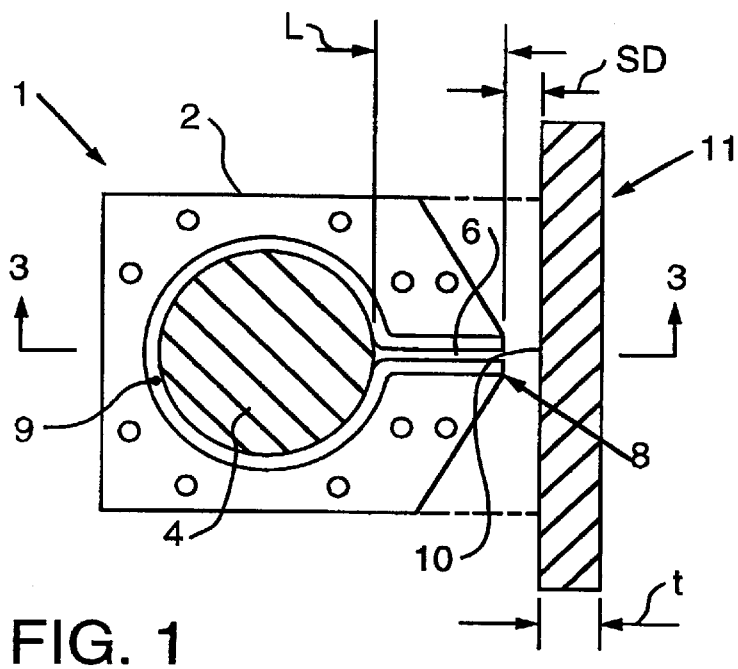
FIG. 1 is a cross-sectional view showing a front elevation view of the cutting apparatus of the present invention.
Figure 2:
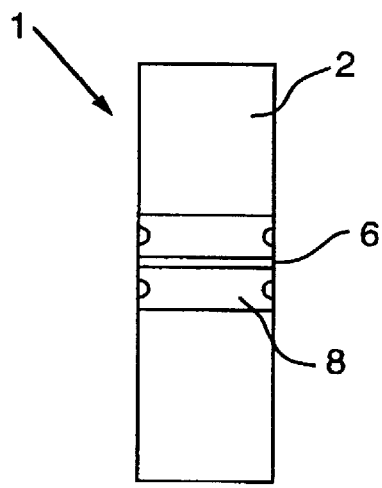
FIG. 2 is a right side elevational view of the cutting apparatus of the present invention.

Referring now to FIGS. 1 and 2, the apparatus 1 for cutting target material of the present invention is provided with a housing 2 having an inner cavity 4. An elongated nozzle 6 extends from the inner cavity 4 to an exterior surface 8 of the housing 2. In operation, exterior surface 8 of the housing 2 may be positioned generally adjacent to a surface 10 of target material 11 to provide the elongated nozzle 6 a line of engagement between the cutting apparatus 1 and the surface 10, or □cutting zone□, of the target material 11. The elongated nozzle 6, which extends from the inner cavity 4 of the housing 2 to the exterior surface 8 of the housing 2 may have a length L of about 0.3 to 1.5 inches. In the form shown, the target material 11 may have a thickness t. The preferable range of thickness t for materials cut by the apparatus 1 of the present invention is about 0.25 to 2 inches. The region where the cutting apparatus 1 performs its cutting function on these materials is preferably of a substantially uniform thickness.

Referring again to FIGS. 1 and 2, the apparatus 1 for cutting target material of the present invention is designed to space a portion or end of the elongated nozzle 6 from the surface 10 of the target material 11 by a standoff distance SD based on the thickness t of the target material 11. This standoff distance SD or nozzle standoff may be from about $\frac{1}{16}$ to $\frac{1}{4}$ of an inch from the surface 10 of the target material 11 to be cut.

Nozzle standoff is related to the scale of the apparatus 1, and in general, a larger cutting apparatus 1 would require a correspondingly larger standoff distance SD.

Figure 3:
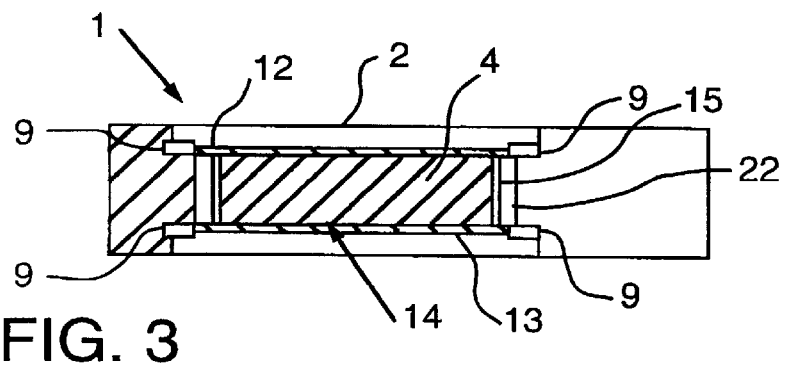
FIG. 3 is a cross-sectional view taken along 3—3 of FIG. 1.

Referring now to FIGS. 1 through 3, the cutting apparatus 1 further includes a charge tube 22 which seats in the inner cavity 4 and a set of liners 12,13,15 which, when inserted into or adjacent to the charge tube 22, provide supportive containment for a thermite charge 14 during installation and activation of the thermite charge 14. The liners 12,13 are preferably embodied as generally round, disc-shaped pieces which may be positioned generally adjacent to the thermite charge 14 within the charge tube 22. The liners 12,13,15, regardless of the number of layers employed, preferably may have a total thickness of about 0.002 to 0.008 inches. The inside of the charge tube 22 may be lined with at least two layers of the liner 15, which is generally rectangular in shape, and from one to two layers of the liners 12,13 which are positioned to cover the thermite charge 14.

Referring now to FIGS. 1 through 5, in another aspect of the present 30 invention, the inner cavity 4 of the housing 2 may further contain an apparatus 21 for generating a cutting flame. As shown, the apparatus 21 includes the charge tube 22 having a thermite charge 14 disposed within the charge tube 22. The thermite charge 14 is pressed into the charge tube 22. The charge tube 22 is then inserted into the inner cavity 4 of the housing 2. In this aspect of the present invention, the liners 12,13,15 have a specific volume from about 0.39 to 0.29 $cm^3$ per gram of the thermite charge 14 employed in the apparatus 21. An activation device 26 is incorporated into the structure of the apparatus 21 of the present invention and may be a fuse 26 inserted through an opening 25 in the charge tube 22 for activation of the cutting apparatus 1.

Referring again to FIGS. 4 and 5, in operation the charge tube 22 is placed into a conventional loading tool (not shown) and the thermite charge 14 is pressed into the charge tube 22 to the desired density. The loading tool may be any conventional handheld or stationary device for pressing desired amounts and densities of thermite charge 14 into the charge tube 22. A conventional activation device 26 such as a fuse 26 available from Pyrofuse Corporation of Mt. Vernon, N.Y., may be inserted during this pressing procedure and positioned to extend through the opening 25 formed in the charge tube 22. The opening 25 is internally covered with the liner 15, which may be composed of a polytetrafluoroethylene (PTFE) tape, to contain the thermite charge 14 when it is pressed into the charge tube 22 and positioned in the inner cavity 4 in preparation for cutting use. Subsequently, the fuse 26 is inserted to penetrate the liner 15 to extend to the exterior of the charge tube 22.

Referring now to FIGS. 1 through 5, in operation, thermite powder is pressed into the charge tube 22 to the desired shape and density. As a result, the charge 14 employed in the cutting apparatus 1 is preferably a formable material which can be stored and handled independently from the other elements of the cutting apparatus 1. In the charge tube 22, the liners 12,13,15 provide additional gaseous product for the charge 14 which contributes to the cutting action of the apparatus 1. There are fluorine radicals in a PTFE liner, for example, which can interact with a thermite charge 14 to provide an augmented cutting action. The liners 12,13,15 may be composed of any suitable material such as PTFE.

It will also be appreciated that each cutting apparatus 1 is used only once during operation. The material and structure of the cutting apparatus 1 are permanently altered after a cycle of cutting a target material 11.

Referring again to FIGS. 4 and 5, the thermite charge 14 preferably is a powder composition which comprises by weight from about 15% to 20% aluminum, from about 78% to 85% CuO, from about 1% to 3% SiC, and from about 0.2% to 4% nitrocellulose. The composition of the powder in the thermite charge 14 more preferably may include parts by weight about 16% to 18% aluminum, about 80% to 83% CuO, about 1% to 2% SiC, and about 0.5% to 2% nitrocellulose. Nitrocellulose is preferably used in the composition, but could also be substituted by another suitable, high-temperature application explosive, to provide the propellant component of the composition. In addition, nitrocellulose acts as a binding agent for the thermite charge 14 and is suitable for cohesive forming of thermite charge shapes.

Figure 4:
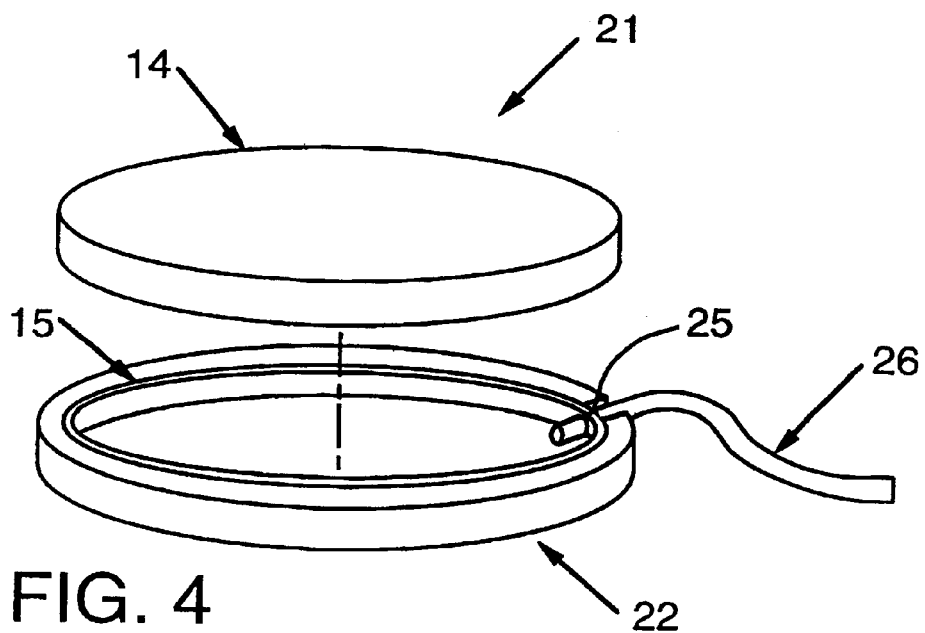
FIG. 4 is an exploded schematic view of the charge tube and thermite charge of the present invention.
Figure 5:
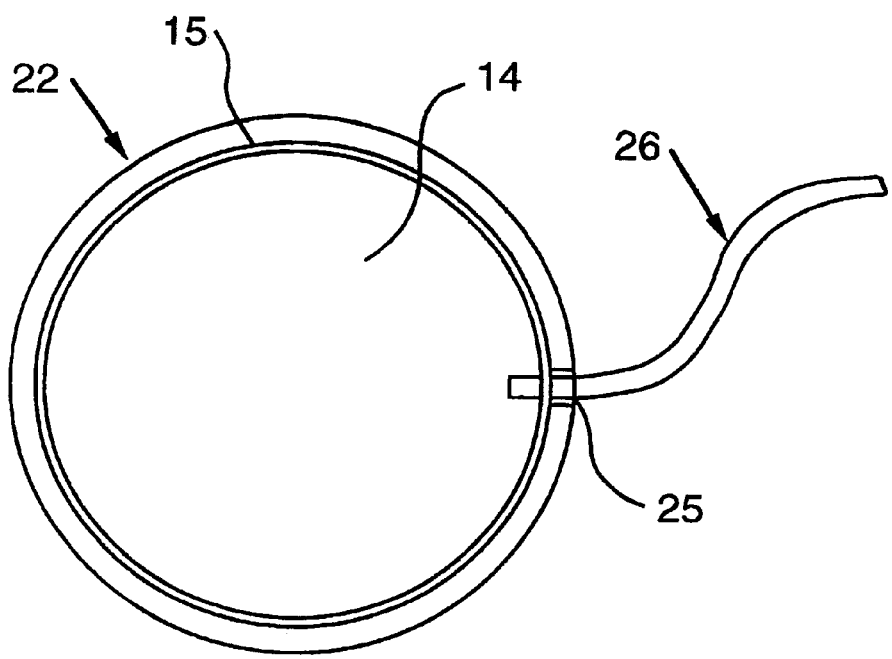
FIG. 5 is a top plan view of the charge tube of the present invention.

Referring now to FIGS. 4 and 5, the charge density of the powder of thermite charge 14 is preferably in the range from about 50% to 67% of its theoretical maximum density. It will be appreciated by those skilled in the art that the density of the powder of thermite charge 14 is balanced to provide reliable ignition and to maximize the cutting action. In the present invention, for example, the use of about 60% to 65% theoretical maximum density of the thermite charge powder is optimum for cutting materials such as steel. It has been found that an aluminum and cupric oxide powder composition provides the substantial thermal yield required for the present invention. Components such as beryllium and lead oxide might yield even more substantial thermal energy but also have toxicity problems associated with their general use in cutting apparatus.

Referring again to FIGS. 1 through 3, the inner cavity 4 of the housing 2 may define a generally cylindrical volume. The inner cavity 4 may also define a rectangular-shaped volume, a pie-shaped volume or another suitably shaped configuration. The inner cavity 4 may further define a predetermined volume to accommodate a sufficient amount of a thermite charge 14 to ensure effective cutting action on a particular thickness of material 11 such as steel. It will be appreciated that the cross-sectional area of the elongated nozzle 6 generally adjacent to the target material 11 to be cut is related to the burn rate of the thermite charge 14. Use of a pie-shaped charge, for example, can result in cutting substantially deeper into a target material 11 with a reduced thermite charge mass by presenting a progressively wider burn front to the surface 10 of the target material 11 to be cut.

Figure 6:
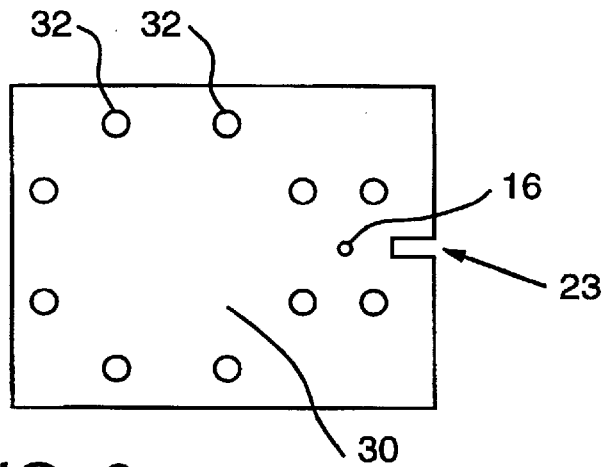
FIG. 6 is an end elevational view of the end plate of the present invention.

Referring now to FIGS. 1, 3 and 6, the cutting apparatus 1 may further include a set of end plates 30 or cover plates for sealingly enclosing the inner cavity 4 once a thermite-based material has been placed therein. The end plate 30 may further include a plurality of holes 32 formed therein for receipt of mechanical fasteners to secure the inner cavity 4. A set of O-rings (not shown) or other conventional sealing devices (not shown) may be lubricated and then positioned into a set of outside grooves 9 formed between the inner cavity 4 and the charge tube 22 positioned in the inner cavity as depicted in FIG. 3. The set of O-rings or other conventional sealing devices serve to seal the thermite charge 14 within the inner cavity 4 of the housing 2 when the end plates 30 are installed and compressed against the sealing devices positioned in the outside grooves 9.

Figure 7:
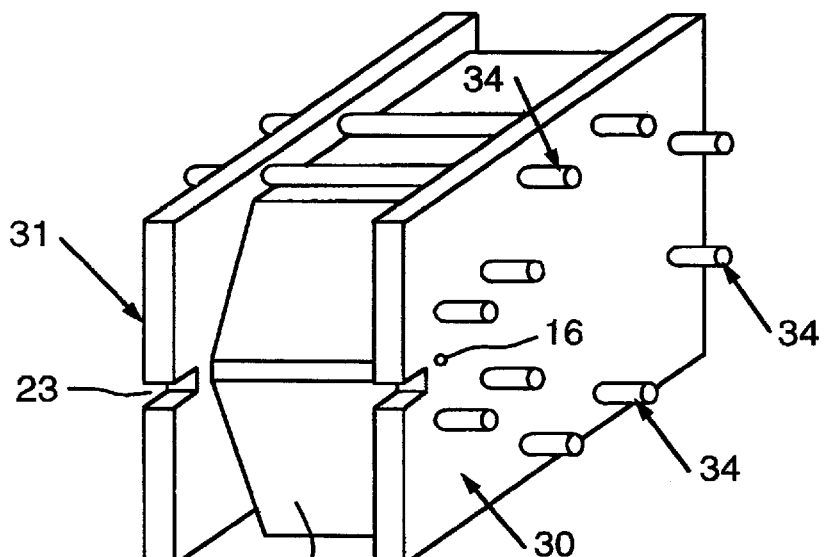
FIG. 7 is an isometric view of the assembled cutting apparatus of the present invention.
Figure 8:
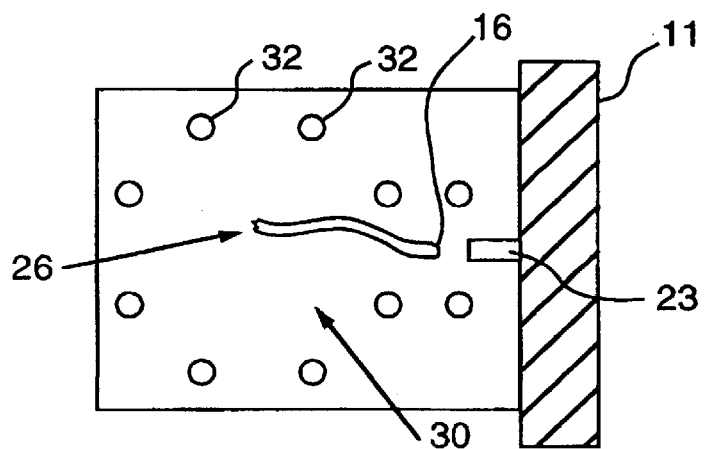
FIG. 8 is a rotated, front elevational view of the cutting apparatus of the present invention positioned on the surface of a target material to be cut.

Referring next to FIGS. 7 and 8, mechanical fasteners 34 for securing the end plates 30,31 to the housing 2 are provided to cooperate with the set of O-rings (not shown) or other conventional sealing devices to enclose and seal the inner cavity 4 and the thermite based material in the housing 2. These mechanical fasteners 34 for securing a set of end plates 30,31 to the housing 2 may be embodied as screws or other conventional mechanical fasteners extended and fastened between holes 32 which correspond between each of the set of end plates 30,3 1. The end plates 30,31 have a thickness preferably in the range of ³⁄₁₆ of an inch.

Referring now to FIGS. 1, 7 and 8, any conventional holding device (not shown) such as clamps, thermite welding magnets, suction devices, or counter thrust devices may be employed to maintain the housing 2 in substantial contact with the target material 11. The holding device is provided to engage a surface of the target material 11 and to maintain stability for the housing 2 including end plates 30,31 positioned on the target material 11.

In addition, the activation device 26 may be passed through a hole 16 in either of the end plates 30,31 which is adjacent to the slot 23 formed in each of the set of end plates 30,31. The hole 16 is preferably positioned in the general proximity of the slot 23. The hole 16 receives the fuse 26 from the opening 25 in the charge tube (not shown) and places the fuse 26 for access outside of the housing 2. The slot 23 permits the cutting flame to "fan out" when the cutting apparatus is activated on the surface of a target material Referring now to FIGS. 6 through 8, the end plate 30 may comprise a material selected from the group consisting of steel alloy and plastic composites and is further characterized as having relatively high tensile strength. In particular, a glass epoxy composite known to those skilled in the art as G-10 may be employed for the material composition of the end plate 30.

Referring again to FIGS. 1 through 3, the housing 2 of the apparatus 1 for cutting material is preferably composed of a material selected from the group consisting of high density graphite and phenolic composites. The housing 2 may be composed of any suitable material adapted to withstand generation of a thermite-based cutting flame. It will be appreciated that the housing 2 has relatively high flexural and tensile strengths which are also consistent with relatively low thermal conductivity. A housing 2 composed of mineral phenolic is preferable given its performance characteristics in the practice of the present invention. Other suitable materials which may be used to construct the housing may include, for example, graphite, polymer composite materials, and glass-filled PEEK (polyetheretherketone). Graphite, for example, generally provides a preferable degree of erosion resistance and has relatively low flexural strength and relatively high thermal conductivity.

Figure 9:
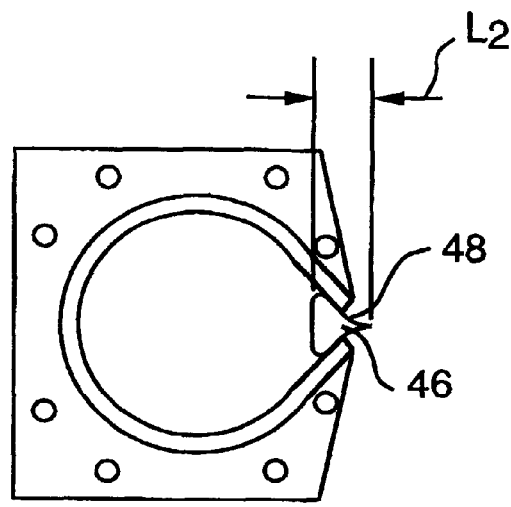
FIG. 9 is a rotated, cross-sectional view showing a front elevation view embodiment of the present invention having a modified nozzle.

In another embodiment of the present invention shown in FIG. 9, the length of the elongated nozzle 46 is shortened. The nozzle 46 preferably has a length $L_2$ of 0.3 to 0.4 inches. In this embodiment, the modified nozzle 46 is considered to be a "supersonic" or □hypersonic□ nozzle 46. These terms are indicative of the high velocity jet exiting the modified nozzle 46. A directional foil 48, or wing-like element, is inserted into the nozzle 46 of this embodiment to redirect the cutting flame around the contour of the foil 48. This further improves the effectiveness of the cutting flame by focusing the high temperature, high velocity jet exiting the nozzle 46.

It will be appreciated by those skilled in the art that the cutting apparatus of the present invention may be oriented in any angle or configuration deemed most expedient for application of the cutting apparatus to a target material to be cut.

Referring again to FIGS. 8 and 10, in another embodiment of the present invention, a ganged apparatus 51 for cutting target material 11 is also provided in the present invention. The ganging of individual housings 61–64 to each other may be accomplished by providing a plurality of holes 32 in each of the end plates 56–60 of the housings 61–64. When, for example, the plurality of holes 32 in the end plate 56 of a housing 61 are substantially aligned with a plurality of holes 32 in a next adjacent housing 62, a connecting apparatus 65 may be extended between and through the corresponding plurality of holes 32 between adjacent end plates 56–58. As a result, from one housing 61 to a next adjacent housing 62, individual housings 61,62 may be connected to establish a connection or a ganging together of the individual housings 61,62 to each other. Likewise separate fuses 26 of individual housings 61–64 in the ganged apparatus may be joined by passing fuses 26 through holes 16 in each of the housings 61–64 to join adjacent nozzles 52–55 and extend the fuse 26 to the outside of the ganged apparatus 51. The ganged together nozzles 52–55 provide an extended, linear cutting action by spreading the cutting flame between adjacent nozzles 52–55 thereby cutting substantially all of the target material 11 underneath the ganged apparatus 51. Slots 23 (as shown in FIG. 8) in each end plate 56–60 facilitate the spread of the cutting flame of each housing 61–64.

Referring now to FIGS. 1, 7, 8, and 10, when combined to form a ganged apparatus 51, n number of housings 61–64 containing thermite charges are separated by n–1 individual end plates 57–59 (where n is a positive integer greater than one) and each end 68,70 of the resulting ganged apparatus 51 is enclosed with an end plate 56,60. The activation device 26 which may be a fuse 26 is passed through the hole 16 adjacent to the slot 23 formed in each of the set of end plates 30. In this fashion, each of the activation devices 26 is exposed to the cutting flame action of an adjacent housing 61–64 of the ganged apparatus 51. The activation device 26 from one of the housings 61–64 is positioned on an end 68 of the ganged apparatus 51 and is accessible for receiving external or remote activation. The slot 23 in the end plate 30 also serves to permit the cutting flame to fan out laterally and virtually eliminate any uncut regions on the target material 11 to be cut between cutting apparatus 1 of the ganged apparatus 51. When the ganged apparatus 51 is assembled and positioned for use, the elongated nozzle 6 of each individual apparatus 1 is positioned a standoff distance SD from the surface of the target material 11 to be cut. An appropriate nozzle length L is also selected based on dimensions of the individual cutting apparatus 1 of the ganged apparatus 51 and the thickness of the target material 11 to be cut.

Referring again to FIGS. 1, 2, and 4, a method of the present invention is provided for cutting target material 11 with a cutting apparatus 1. The method includes providing at least one housing 2 having an inner cavity 4 and an elongated nozzle 6 in communication with the inner cavity 4 and the exterior 8 of the housing 2. The elongated nozzle 6 in this method is structured to be generally adjacent to a surface of the target material 11 when the apparatus 1 is placed on the target material 11. Next, an apparatus 21 and the thermite charge 14 are positioned within the inner cavity 4 for generating a cutting flame. The nozzle 6 of the method is positioned a standoff distance SD from the surface of the target material 11 to be cut and finally, the cutting flame is activated to effect the desired cutting action. Activating the cutting flame may be accomplished by activating a device 26 coupled to the thermite charge 14 such as a fuse 26.

Figure 10:
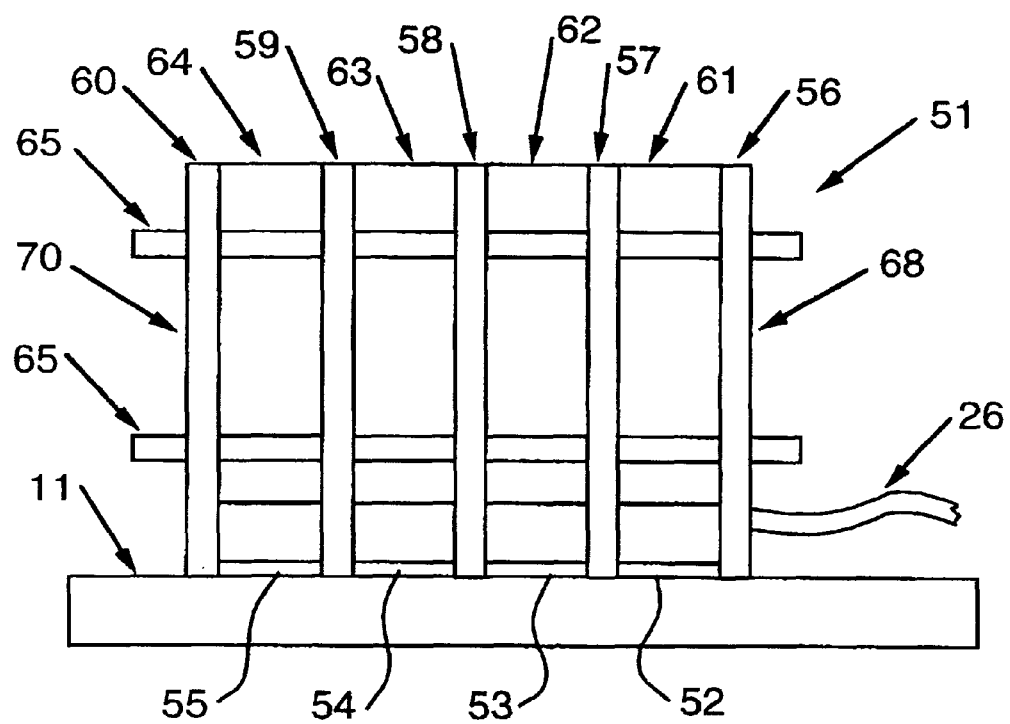
FIG. 10 is a side elevational view of a modified embodiment having multiple cutting apparatus ganged together.

Referring now to FIGS. 4 and 10, in another method embodiment of the present invention, individual cutting apparatus housings 61–64 are coupled together consecutively to form a ganged cutting apparatus 51 for cutting target material 11. In combining several of the cutting apparatus housings 61–64, a conventional screw and socket device 65 may be employed to enable a multiple attachment or ganged apparatus 51 of several cutting apparatus housings 61–64, as shown in FIG. 10, to provide an extended, linear cutting action. The screw and socket device 65 is preferably adjustable so that the length of the ganged together apparatus 51 positioned on the target material may be increased or decreased. In this method embodiment of the present invention, a first housing such as housing 61 is provided. Next, at least a second housing 62 is provided, with similarly structured characteristics as the first housing 61, and is coupled to the first housing 61 with an end plate 57 therebetween and on both ends 56,58 of the ganged cutting apparatus 51. In addition, the individual activation devices 26 of sequential cutting apparatus housings 61–64 are ignited sequentially by the cutting flame of the adjacent housing and, when activated, will substantially sequentially initiate the cutting flame of the ganged cutting apparatus 51 to effect cutting of the target material 11. In this method, a relatively longer and more sustained linear cutting effect is achieved by use of consecutively coupled individual housings 61–64.

In another aspect of the present invention, depicted in FIGS. 11 through 17, a cutting apparatus is provided which is capable of being positioned on the surface of a shaped piece of material, such as a cylindrical bar, steel bar, bar stock, and tubular materials. In this aspect of the invention, one cutting apparatus is connected to another, substantially identical, cutting apparatus to provide opposed cutting apparatus for attacking a target material from at least two directions.

Figure 11:
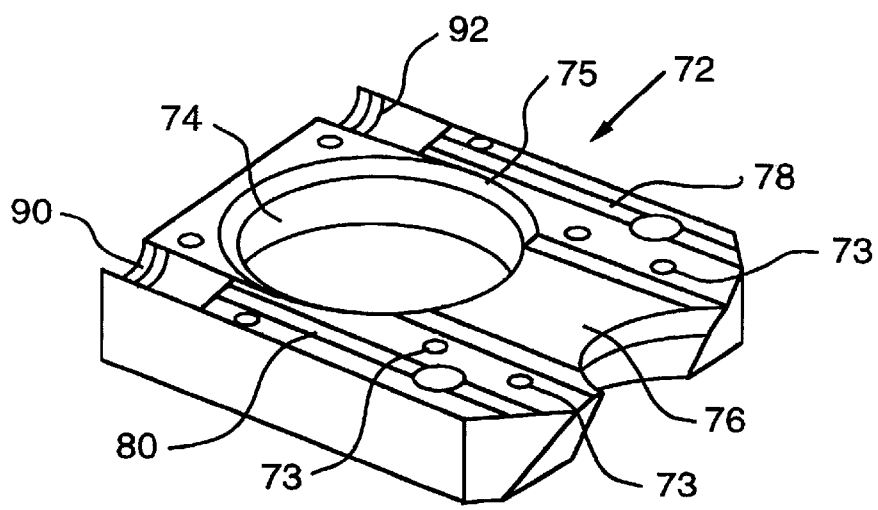
FIG. 11 is a perspective view of a containment block of the present invention.
Figure 12:
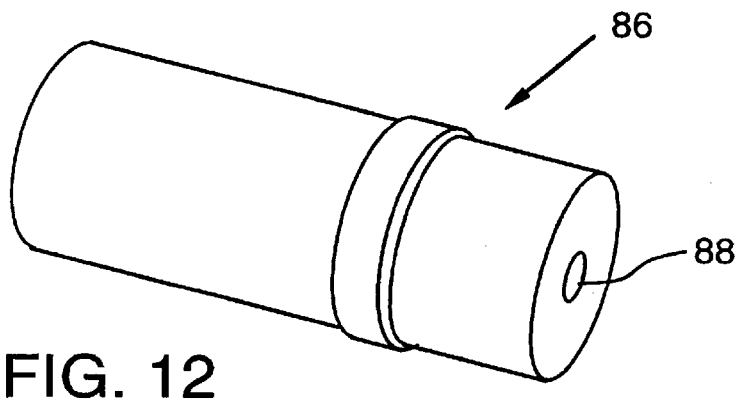
FIG. 12 is a perspective view of a match housing of the present invention.

Referring now to FIG. 11, an exemplary containment block 72 is shown which, when coupled to another, substantially identically structured containment block, forms a housing to provide cutting action in the present invention. The containment block has an inner cavity 74 and a nozzle channel 76. The width of the nozzle channel 76 is preferably in the range from about 0.1 inches to 4 inches. The length of the nozzle channel 76 is preferably in the range from about 0.3 to 3 inches. The thickness of the nozzle channel 76 is preferably in the range from about 0.01 to 0.2 inches.

Referring again to FIG. 11, the nozzle channel 76 is preferably provided with a rectangular cross-section. The nozzle channel 76 provides a pathway and focus for discharge of the cutting flame upon activation of the thermite-based charge contained in the inner cavity of each apparatus. In addition, fuse channels 78,80 located near the general periphery of the containment block provide communication for an activation device, such as a fuse, to connect the thermite-based charges to form a common fuse junction. Two recesses 90,92 formed in a portion of the containment block 72 are designed to accept a back-up "safety fuse" to provide redundancy and reliability in initiating fuse activation.

The recesses 90,92 cooperate with the fuse channels 78,80 to provide communication between the inner cavity 74 and external activation of a charge contained in the inner cavity 74. In cutting operation, one of the recesses 90,92 may receive a match housing, such as the match housing depicted in FIG. 12, to permit electrical activation of the fuse.

Figure 13:
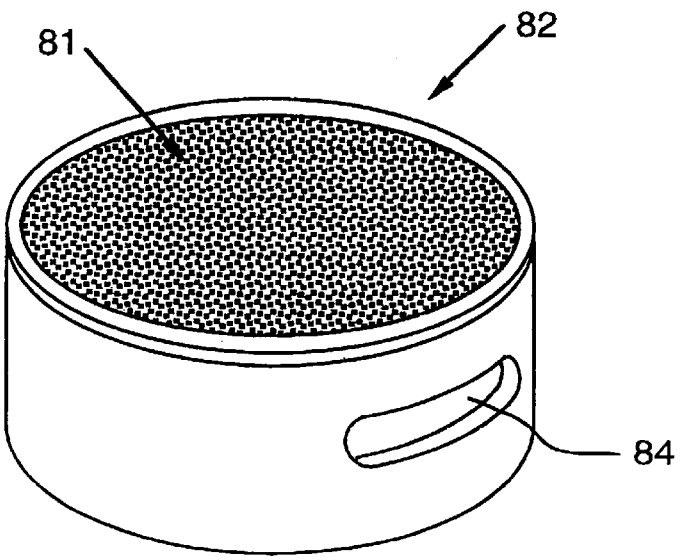
FIG. 13 is a perspective view of a charge tube of the present invention.

Referring now to FIGS. 11 and 13, a thermite charge 81 may be pressed and formed into a charge tube 82 having a slot 84 formed therein. The charge tube 82 may be provided as a phenolic tube. The slot 84 is milled into the charge tube 82 and is positioned, in cutting operation, in substantial alignment with the nozzle channel 76. The slot 84 directs cutting energy generated by activation of the thermite charge 81 through the nozzle channel 76 and onto the target material surface. A conventional, suitable material such as aluminum foil may be placed over one end of the tube 82 to permit the thermite charge 81 to be pressed and formed in the tube 82. The charge density of the thermite charge 81 pressed into the tube is preferably 52% of theoretical maximum density. The thermite charge 81 is preferably composed of, by weight, about 15% to 25% of aluminum, about 75% to 85% cupric oxide, and about 0.5% to 5% silicon carbide. The thermite charge 81 most preferably consists of, by weight, about 16.7% of Al, 81.8% of CuO, and 1.5% of SiC.

Figure 14:
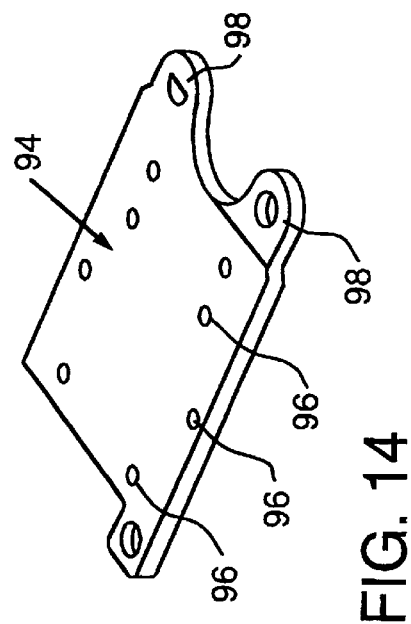
FIG. 14 is a perspective view of an embodiment of the end plate.

Referring now to FIGS. 11, 13 and 14, an exemplary end plate 94 of the embodiment of the present invention is provided. A hole pattern 96 is formed in each of the end plates 94 to correspond to the hole pattern in another end plate. Likewise the containment block 72 has a hole pattern 73 formed therein which corresponds to the hole pattern of end plates 94 and to the hole pattern of another similarly structured containment block. The end plates 94, in operation, are positioned to enclose the inner cavity 74 after two containment blocks are connected together to form a housing. The containment blocks 72 of the housing permit passage of mechanical fasteners such as steel rivets, for example, to hold the end plates 94 securely against the housing. Referring more specifically to FIG. 11, the housing may be sealingly contained by a conventional sealing apparatus, such as an O-ring, inserted into a groove 75 formed around the perimeter of the inner cavity 74. Referring now to FIG. 14, end plates 94 each having a set of ears 98 are attached to both sides of the housing and connected together. The end plates 94 work in conjunction with the compressed O-ring to sealingly contain the inner cavity.

Figure 15:
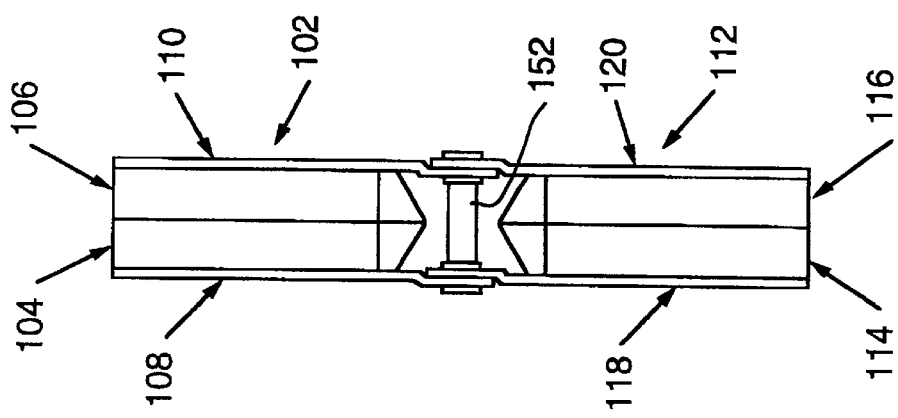
FIG. 15 is a side elevational view of the opposed cutting apparatus.

Referring now to FIG. 15, there is illustrated a pair of housings in relative opposed cutting positions. As previously discussed, a housing 102 is formed by the connection of two containment blocks 104,106 to each other, which form an inner cavity (not shown) having a charge disposed therein. The end plates 108,110 are positioned to sandwich the containment blocks 104,106 together to form the housing 102 and seal the thermite-based charge (not shown) therein. Another housing 112 comprises two containment blocks 114,116 which are sandwiched and sealed into a housing 112 by a set of end plates 118,120. The respective nozzle channels of the housings 102,112 are positioned to be substantially opposed in order to effect a cutting action on the same target material from two opposite directions.

Figure 16:
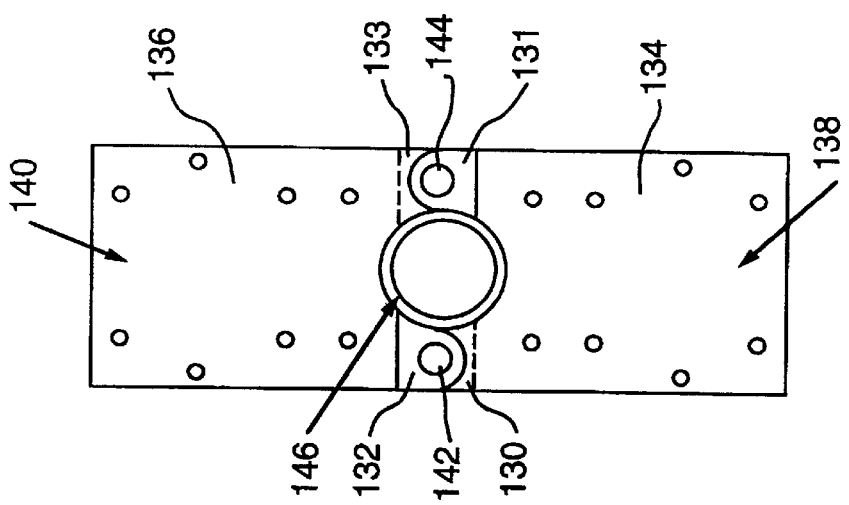
FIG. 16 is a top plan view of the opposed cutting apparatus of FIG. 15.

Referring now to FIG. 16, ears 130,131,132,133 on the end plates 134,136 provide attachment between opposing cutting apparatus 138,140. For example, the ear 130 on the cutting apparatus 138 corresponds to and complements the ear 132 on the cutting apparatus 140. One set 142 of complementary ears is provided as a hinge point and the other set 144 is provided with a releasable connection. This provides rotatable attachment about the pivot point formed by one set of ears 142 while the other set 144 is fixedly attached to resist separation of the opposing cutting apparatus 138,140 during operation.

Figure 17:
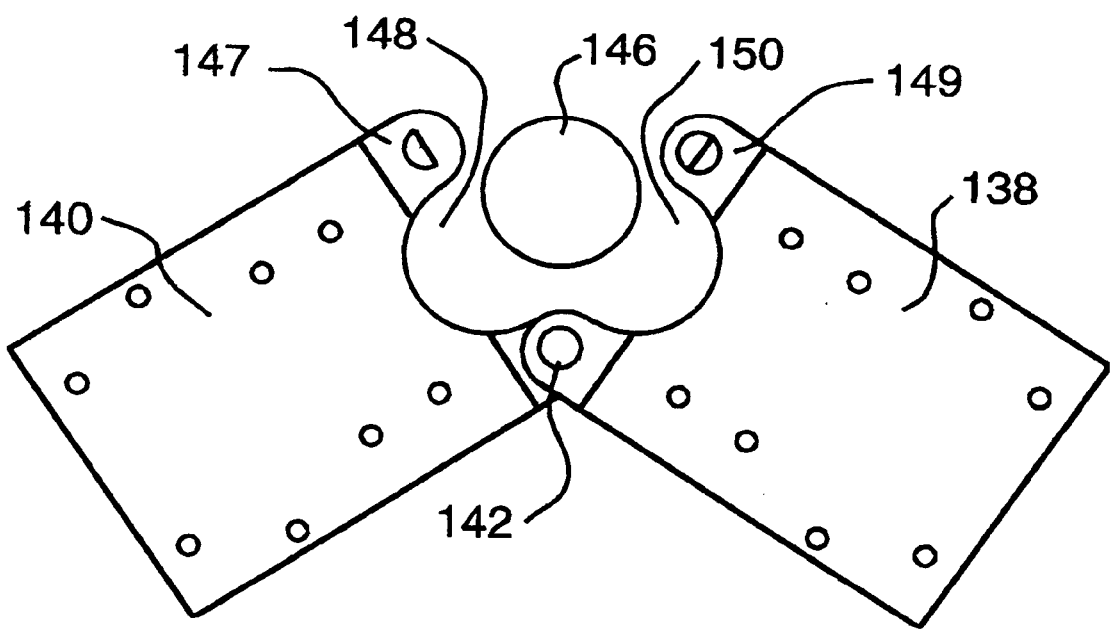
FIG. 17 is an exploded elevational view of the opposed cutting apparatus.

Referring now to FIGS. 16 and 17, rotation about the hinge point 142 permits a target material 146, such as bar stock, to be inserted into the "jaw" formed by rotation of opposing nozzle channels 148, 150 about the hinge point 142. Once the target material 146 is inserted the cutting apparatus 138, 140 may be again rotated about the hinge point 142, closing the "jaw", to secure the target material 146 within the cutting zone formed between the cutting apparatus 138, 140. The hinge point 142 is secured by a conventional pin (as shown more particularly by pin 152 in FIG. 15) to ensure the cutting apparatus 138,140 do not separate during operation. During its swivel-like closing operation around the hinge point 142, the cutting apparatus 138 may have an ear 149 which is structured to latch with an ear 147 of the cutting apparatus 140.

Figure 18:
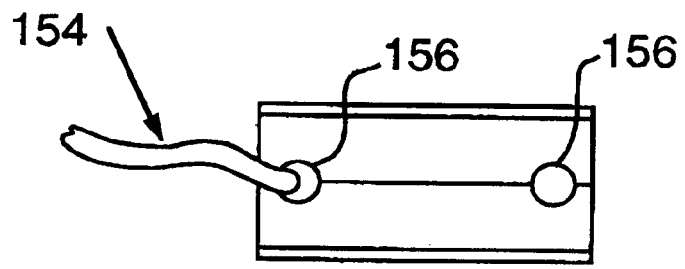
FIG. 18 is a bottom plan view of the opposed cutting apparatus of FIG. 16 of the present invention.

As shown in FIGS. 15 and 18, an activation device such as a fuse 154 may be extended from the activation holes 156 formed when two containment blocks such as the containment blocks 114, 116 are joined together. The activation device 154 permits substantially simultaneous activation of thermite charges contained in the respective cutting apparatus 138,140. It will be appreciated that the arrangement of this embodiment of the present invention also provides for substantially simultaneous activation of two charges from any of four ignition points.

Referring again to FIG. 16, the cutting apparatus 138,140 are preferably comprised of a material such as those described above, including mineral phenolic, which possesses suitable flexural and tensile strength characteristics while providing relatively low thermal conductivity to prevent energy loss from the cutting apparatus.

It will be appreciated that the dimensions of the cutting apparatus may be modified within the scope of the present invention to cut various sizes and shapes of target materials. Preferably, the cutting apparatus of the present invention may be employed, for example, to cut steel bars of up to one inch in diameter. It is believed that the diameter of a bar which can be successfully cut by the present invention is proportional to the diameter of the thermite charge employed in the cutting apparatus of the present invention. The charge diameter may range from about 0.25 to 12 inches. The density of the thermite range may be in the range from about 47% to 80% of theoretical maximum density.

The present invention offers a thermite based apparatus and method for cutting target material of a substantial thickness. The present invention provides an elongated nozzle to focus the cutting flame energy of the cutting apparatus and a method for effecting extended, linear and substantially simultaneous opposing cutting action in materials of varying sizes, shapes, and thicknesses. The nature of the thermite charge employed in the present invention offers substantial health and safety benefits during operation of the cutting device.

Whereas particular embodiments of the present invention have been disclosed, it will be evident to those skilled in the art that numerous variations of the details may be made without departing from the invention as defined in the appended claims.

What is claimed is:

1. An apparatus for cutting a target material having a surface to be cut comprising:
   at least one housing having an inner cavity,
   an elongated nozzle having a first end in communication with said inner cavity and a second end in communication with the exterior of said housing, said second end of said elongated nozzle provided for positioning generally adjacent to said surface of said target material;
   cutting flame generating means disposed within said inner cavity;
   activating means operatively associated with said cutting flame generating means to generate a cutting flame to cut said target material; and
   wherein said apparatus is structured to be positioned a standoff distance from said surface of said target material when said apparatus is placed on said surface of said target material.

2. The apparatus of claim 1, wherein said cutting flame generating means has a thermite charge.

3. The apparatus of claim 2, wherein said thermite charge includes a powder comprising, by weight, about 15% to 20% aluminum, about 78% to 85% CuO, about 1% to 3% SiC, and about 0.2% to 4.0% nitrocellulose.

4. The apparatus of claim 3, wherein said thermite charge includes parts, by weight, about 16% to 18% aluminum, about 80% to 83% CuO, about 1% to 2% SiC, and about 0.5% to 2% nitrocellulose.

5. The apparatus of claim 1, further including a directional foil positioned in said elongated nozzle for focusing said cutting flame against said target material.

6. The apparatus of claim 1, wherein said inner cavity defines a generally cylindrical volume.

7. The apparatus of claim 1, wherein said standoff distance is about 1/16 inches to 1/4 inches.

8. The apparatus of claim 1, further including a liner positioned within said inner cavity generally adjacent to said cutting flame generating means.

9. The apparatus of claim 1 wherein said elongated nozzle is about 0.3 to 1.5 inches in length.

10. The apparatus of claim 1, further including means for sealingly enclosing said inner cavity.

11. The apparatus of claim 1, wherein said housing comprises a material selected from the group consisting of mineral phenolic, graphite, and glass-filled polyetheretherketone.

12. The apparatus of claim 1, wherein said inner cavity defines a predetermined volume to accommodate a sufficient amount of said cutting flame generating means to ensure effective cutting action on a particular thickness of target material.

13. The apparatus of claim 1, wherein said activating means includes a fuse.

14. The apparatus of claim 1, wherein said housing comprises only one said housing.

15. An apparatus for cutting a target material having a surface to be cut comprising:
   a plurality of housings ganged together to provide a substantially continuous linear cutting action. each of said housings comprising:
      an inner cavity;
      an elongated nozzle having a first end in communication with said inner cavity and a second end in communication with the exterior of each of said housings, said second end of said elongated nozzle provided for positioning generally adjacent to said surface of said target material;
      cutting flame generating means disposed within said inner cavity; and
      activating means operatively associated with said cutting flame generating means to generate a cutting flame to cut said target material.

16. A method for cutting a target material having a surface to be cut comprising:
   providing at least one housing having an inner cavity and an elongated nozzle having a first end in communication with said inner cavity and a second end in communication with the exterior of said housing, said nozzle positioned to be generally adjacent to said surface of said target material;
   positioning means within said inner cavity for generating a cutting flame;
   positioning said second end of said elongated nozzle generally adjacent to said surface of said target material, offsetting said nozzle a standoff distance from said surface of said target material; and
   activating said cutting flame generating means to create a cutting flame which effects cutting of said target material.

17. The method of claim 16, wherein said positioning said cutting flame generating means includes placing a thermite charge in a charge tube and positioning said charge tube in said inner cavity of said housing.

18. The method of claim 16, wherein said activating said cutting flame generating means includes activating a fuse.

19. A method for cutting a target material having a surface to be cut comprising:
   providing a plurality of housings ganged together, each of said housings having an inner cavity and an elongated nozzle having a first end in communication with said inner cavity and a second end in communication with the exterior of said housing, said nozzle positioned to be generally adjacent to said surface of said target material;
   positioning means within said inner cavity for generating a cutting flame;
   positioning said second end of said elongated nozzle generally adjacent to said surface of said target material;
   activating said cutting flame generating means to create a cutting flame which effects cutting of said target material; and
   effecting substantially continuous linear cutting action by generating a linear cutting flame from said housing.

20. An apparatus for cutting a target material having a surface to be cut comprising:
- a first containment block comprising an inner cavity and a nozzle channel in communication with said inner cavity and said exterior of said containment block;
- a second containment block substantially similar to said first containment block and joined to said first containment block to form a first housing having an inner cavity and a nozzle channel;
- cutting flame generating means disposed in said inner cavity;
- activating means operatively associated with said cutting flame generating means to generate a cutting flame to cut said target material; and
- a second housing having a nozzle channel positionable opposite to said nozzle channel of said first housing to permit cutting of said material in two directions.

21. The apparatus of claim 20, wherein said nozzle channel has a generally rectangular cross-section.

22. The apparatus of claim 20, wherein said exterior of said first housing has a shape which is complementary to said surface of said target material.

23. The apparatus of claim 20, further including end plates positioned on said first housing to secure said inner cavity.

24. The apparatus of claim 20, wherein said second housing is connected to said first housing.

25. An apparatus for cutting a target material having a surface to be cut comprising:
- a first containment block comprising an inner cavity and a nozzle channel in communication with said inner cavity and said exterior of said containment block;
- a second containment block substantially similar to said first containment block and joined to said first containment block to form a first housing having an inner cavity and a nozzle channel;
- cutting flame generating means disposed in said inner cavity;
- activating means operatively associated with said cutting flame generating means to generate a cutting flame to cut said target material;
- a second housing having a nozzle channel positionable opposite to said nozzle channel of said first housing to permit cutting of said material in two directions, said second housing being connected to said first housing; and
- wherein said connection between said housings comprises a fixed connection and a pivotal connection between said housings.

26. The apparatus of claim 25, wherein said pivotal connection provides open and closed positions for said opposed housings to receive shaped target material therein.

27. The apparatus of claim 26, wherein said housings are structured to cut cylindrically shaped target material.

28. The apparatus of claim 20 further including a set of fuse channels for receiving said activating means.

29. The apparatus of claim 20, further including means disposed in said housing for electrically activating said cutting flame generating means.

* * * * *

UNITED STATES PATENT AND TRADEMARK OFFICE
CERTIFICATE OF CORRECTION

PATENT NO. : 6,183,569 B1
DATED : February 6, 2001
INVENTOR(S) : Jonathan Mohler It is certified that error appears in the above-identified patent and that said Letters Patent is hereby corrected as shown below:

Column 1,
Line 54, "thermitebased" should read -- thermite-based --.

Column 4,
Line 54, "30" should be deleted.

Column 6,
Line 36, "30,3 1" should read -- 30,31 --.
Line 56, after "material" -- 11 -- should be inserted.

Signed and Sealed this

Thirtieth Day of July, 2002

*Attest:*

JAMES E. ROGAN
*Attesting Officer*       *Director of the United States Patent and Trademark Office*